United States Patent [19]
Balling et al.

[11] Patent Number: 6,115,559
[45] Date of Patent: Sep. 5, 2000

[54] CAMERA WITH PROTECTIVE OUTER HOUSING AND SHOCK DAMPENING INSERT

[75] Inventors: Edward N. Balling; Anna C. Schelling, both of Rochester; William F. Preston, Waterloo, all of N.Y.; Jennifer Linnane, Melrose, Mass.

[73] Assignee: Eastman Kodak Company, Rochester, N.Y.

[21] Appl. No.: 09/309,473

[22] Filed: May 10, 1999

[51] Int. Cl.[7] ........................................ G03B 17/02
[52] U.S. Cl. .................................................. 396/541
[58] Field of Search ............................. 396/6, 25, 27, 396/29, 535, 541

[56] References Cited

U.S. PATENT DOCUMENTS 4,882,600  11/1989  Ven de Moere .
5,640,609   6/1997  Reibl et al. .
5,708,898   1/1998  Manabe et al. .
5,732,302   3/1998  Yokota .
5,832,312  11/1998  Rieger et al. .

Primary Examiner—Howard B. Blankenship
Attorney, Agent, or Firm—Roger A. Fields

[57] ABSTRACT

A camera is assembled according to the following method. A one-piece shock-dampening elastomeric member is placed over the front, top and rear of an inner housing. Respective openings in the elastomeric member are aligned with openings in the inner housing for a taking lens and a pair of front and rear viewfinder lenses. A protective outer housing is placed over the inner housing and the elastomeric member. Respective openings in the outer housing are aligned with the openings in the elastomeric member.

10 Claims, 3 Drawing Sheets

CAMERA WITH PROTECTIVE OUTER HOUSING AND SHOCK DAMPENING INSERT

FIELD OF THE INVENTION

The invention relates generally to the field of photography, and in particular to cameras. More specifically, the invention relates to a camera with a protective outer cover and a shock dampening insert.

BACKGROUND OF THE INVENTION

Prior art commonly-assigned U.S. Pat. No. 5,832,312 issued Nov. 3, 1998 discloses a camera comprising a pair of front and rear inner cover parts that together form an opaque inner housing, and a pair of front and rear outer cover parts that together form a protective transparent outer housing which covers the inner housing. The inner housing contains front and rear viewfinder lenses at respective front and rear viewfinder openings in the front and rear inner cover parts and a taking lens at another opening in the front inner cover part. The outer housing has respective openings for the various openings in the inner housing. An elastomeric covering is provided on the outer surface portions of the front and rear outer cover parts.

SUMMARY OF THE INVENTION

According to one aspect of the invention, a method of assembling a camera comprises the steps of:

placing a one-piece shock-dampening elastomeric member over the front, top and rear of an inner housing, with respective openings in the elastomeric member being aligned with openings in the inner housing for a taking lens and a pair of front and rear viewfinder lenses; and placing a protective outer housing over the inner housing and the elastomeric member, with respective openings in the outer housing being aligned with the openings in the elastomeric member.

According to another aspect of the invention, a camera comprising an inner housing, a protective outer housing that covers the inner housing, a taking lens within the inner housing, and an elastomeric member having a light admitting opening for the taking lens, is characterized in that:

the elastomeric member is positioned snugly between the outer and inner housings to provide shock dampening at least in the vicinity of the taking lens.

According to another aspect of the invention, a camera comprising a pair of aligned front and rear viewfinder lenses, a pair of front and rear inner cover parts that together form an inner housing which contains the front and rear viewfinder lenses at respective front and rear viewfinder openings in the front and rear inner cover parts, a protective outer housing that covers the inner housing, and an elastomeric member, is characterized in that:

the outer housing has respective front and rear viewfinder openings for the front and rear viewfinder lenses; and the elastomeric member is a single-piece member that has respective front and rear viewfinder openings positioned snugly between the front and rear viewfinder openings in the outer and inner housings to provide shock dampening at least in the vicinity of the viewfinder lenses.

DETAILED DESCRIPTION OF THE INVENTION

Figure 1:
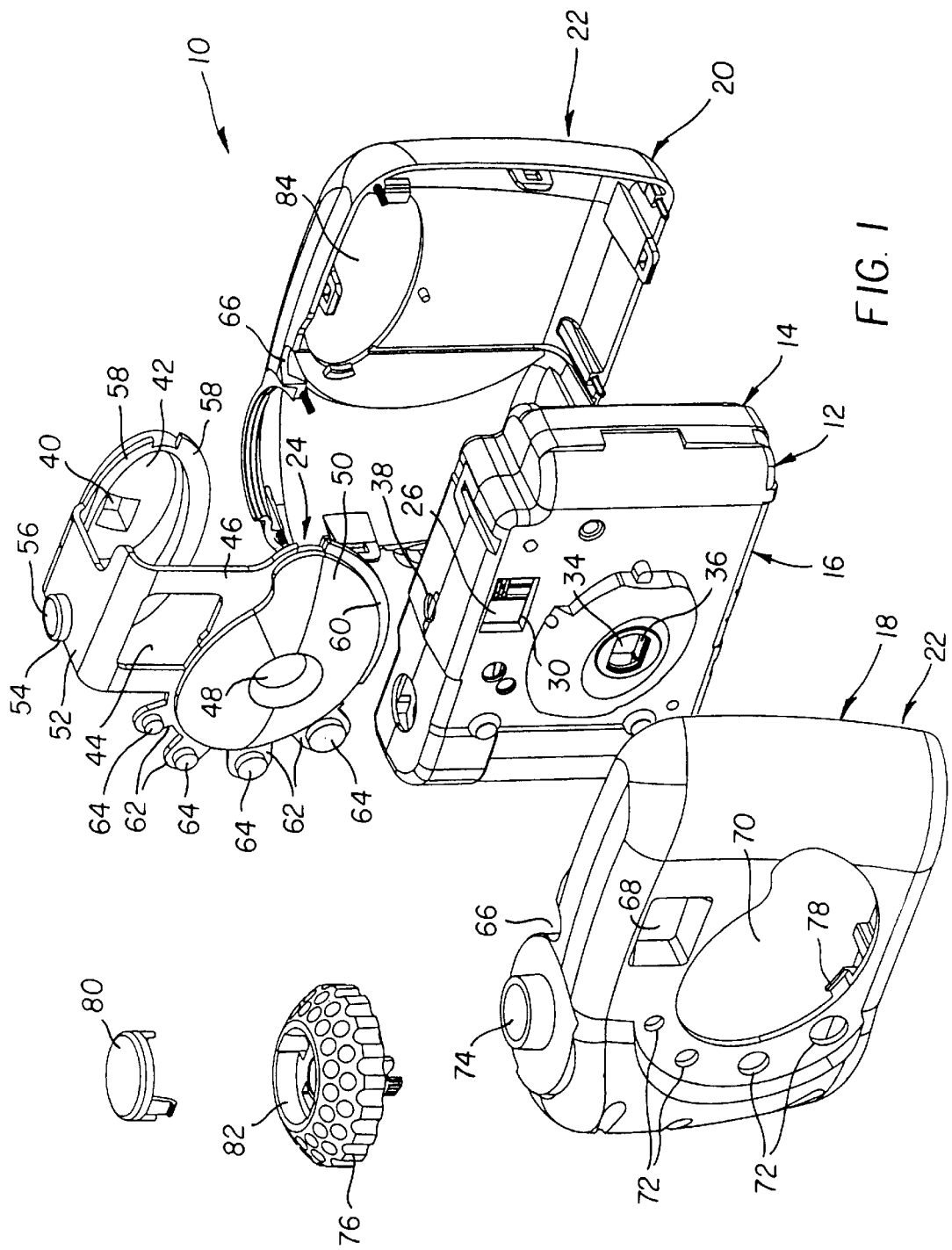
FIG. 1 is an exploded front perspective view of a camera which is a preferred embodiment of the invention.
Figure 2:
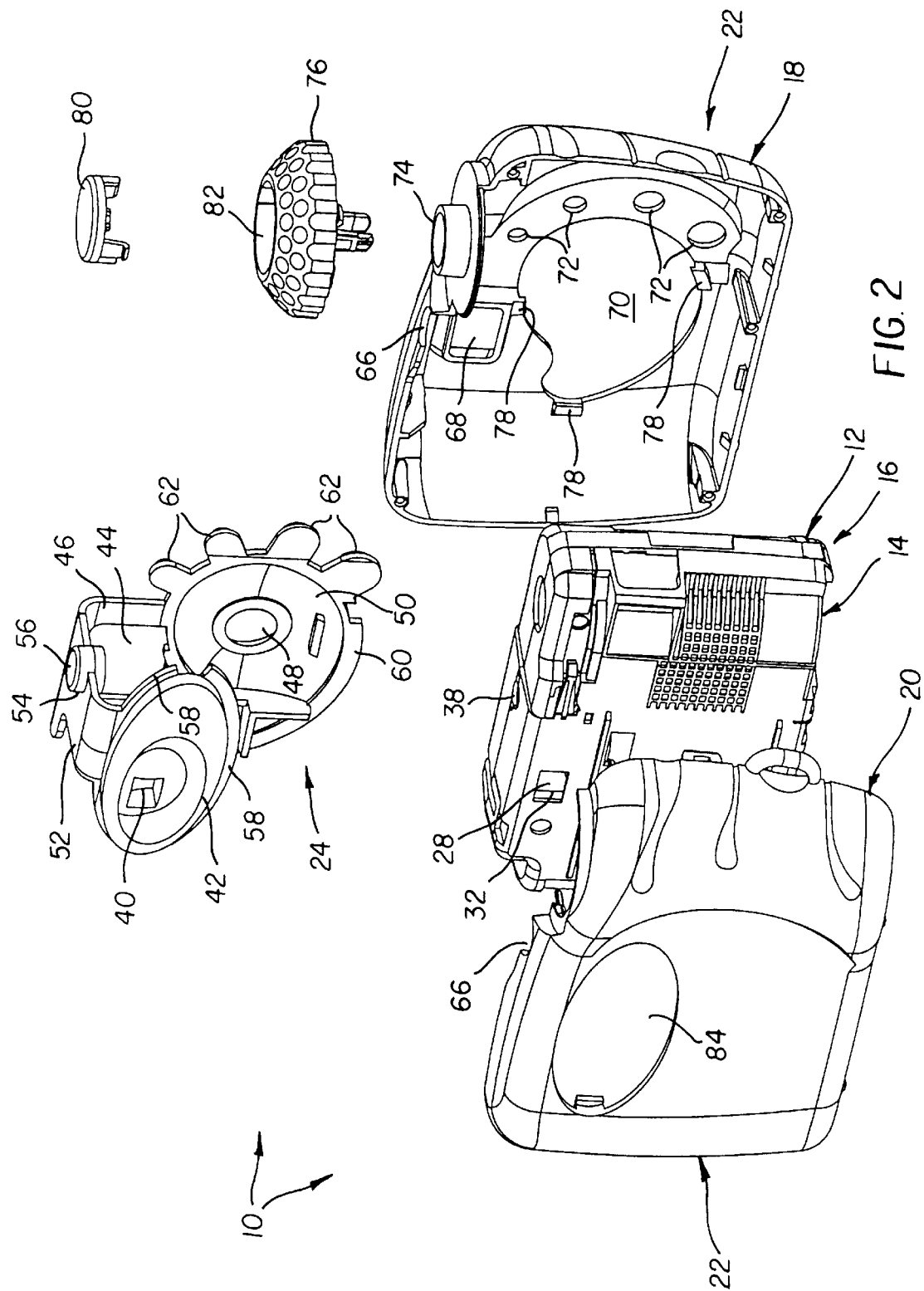
FIG. 2 is an exploded rear perspective view of the camera.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a camera 10 comprising a connected pair of opaque plastic front and rear inner cover parts 12 and 14 that together form an opaque inner housing 16, a connected pair of transparent or translucent plastic front and rear outer cover parts 18 and 20 that together form a protective weather-proof outer housing 22 which covers the inner housing, and a brightly colored rubber or polyvinyl flexible elastomeric (one-piece) insert 24 positioned snugly between the inner and outer housings to act as a shock dampening agent.

The inner housing 16 contains an aligned pair of front and rear viewfinder lenses 26 and 28 at respective front and rear viewfinder openings 30 and 32 in the front and rear inner cover parts 12 and 14, and a taking lens 34 at another front opening 36 in the front inner cover part. See FIGS. 1 and 2. A top frame counter window 38 is embedded in the front and rear inner cover parts 12 and 14 (although it can be embedded in only one of them).

The elastomeric insert 24 has a rear viewfinder opening 40 in a rear convex portion 42 of the elastomeric insert and a front viewfinder opening 44 in a front flat portion 46 of the elastomeric insert, and another front opening 48 which is for the taking lens 34 in a front convex portion 50 of the elastomeric insert. See FIGS. 1 and 2. A flexible interconnection 52 of the elastomeric insert 24 interconnects the rear convex portion 40 and the front flat portion 46, and has an integral collar 54 that circumscribes a top opening 56 in the flexible interconnection for the frame counter window 38. The rear convex portion 40 has a pair of flat arcuate peripheral (edge) projections 58, 58. The front convex portion 50 has one flat arcuate peripheral (edge) projection 60 and four flat fingerlike projections 62, 62, 62, 62. Each one of the flat finger-like projections 62, 62, 62, 62 includes a smaller integral positioning projection 64.

Figure 3:
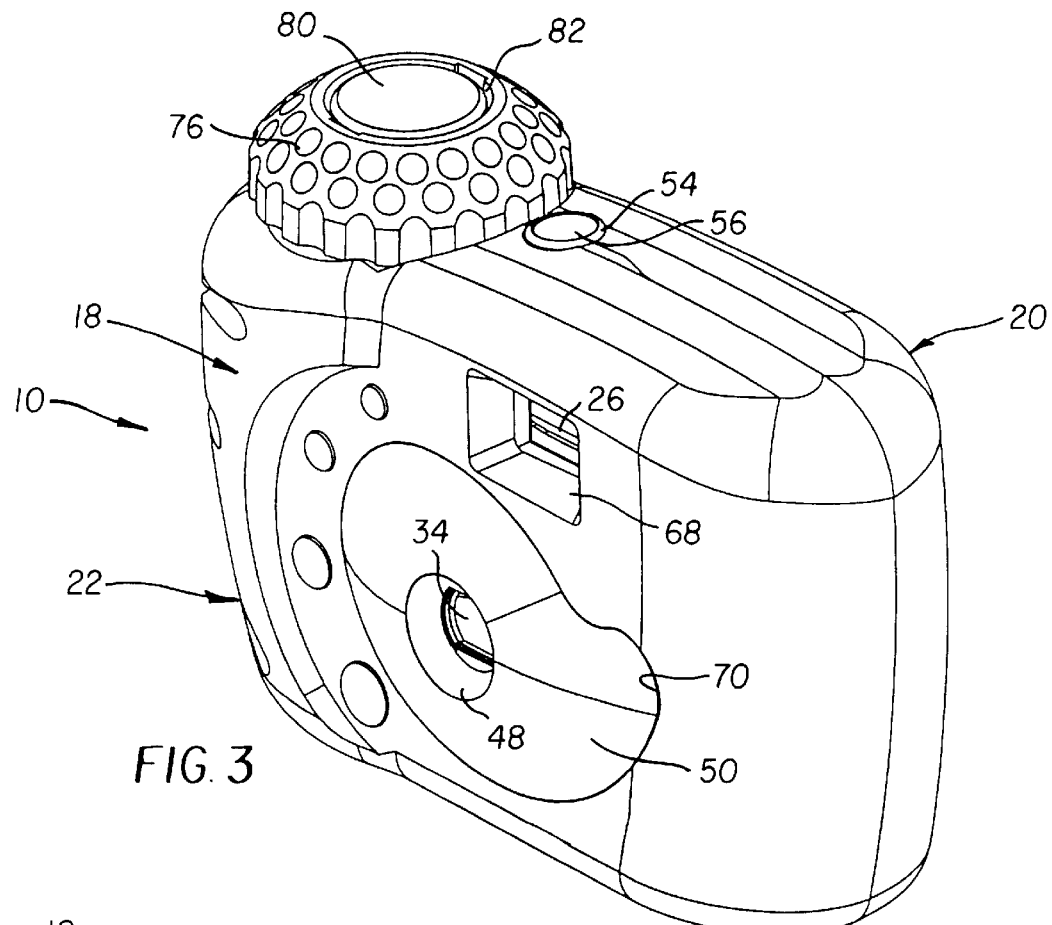
FIG. 3 is an assembled front perspective view of the camera.
Figure 4:
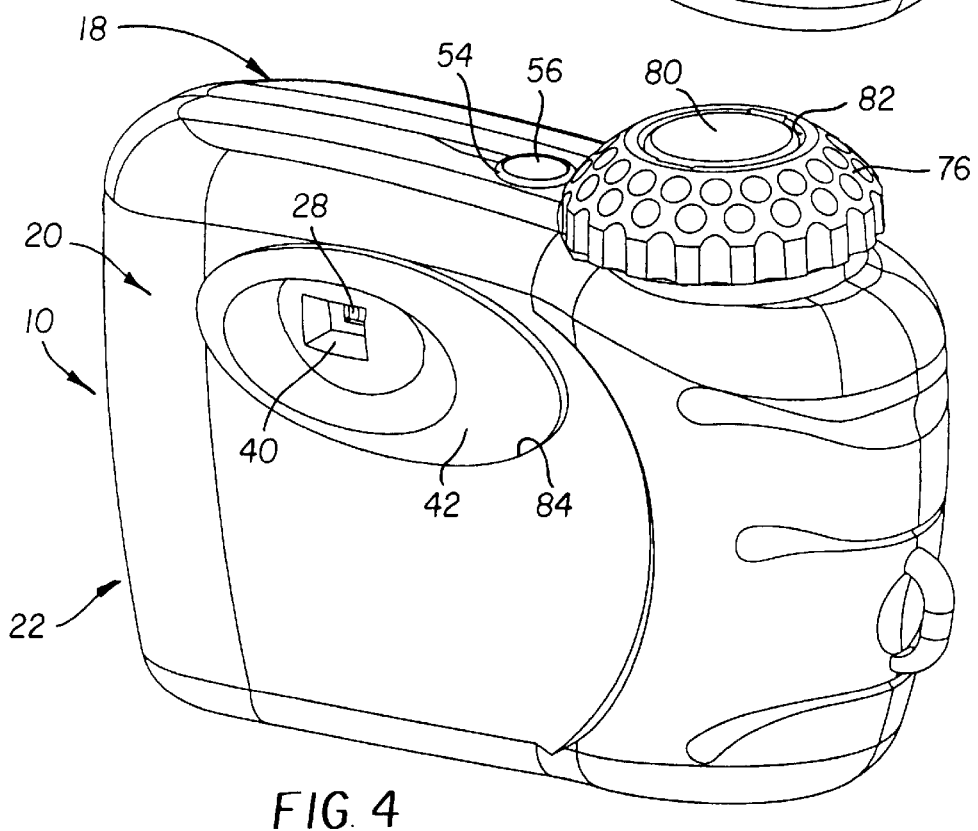
FIG. 4 is an assembled rear perspective view of the camera.

The front and rear outer cover parts 18 and 20 have an in-common top opening 66 for the frame counter window 38. See FIGS. 1 and 2. The front cover part 18 has a front viewfinder opening 68, another front opening 70 which is for the taking lens 34 is large enough for the front convex portion 50 of the elastomeric insert 24 to be received in that opening and protrude outwardly from the opening as shown in FIG. 3, four front openings 72, 72, 72, 72 that are large enough to receive the respective positioning projections 64, 64, 64, 64 of the front convex portion and permit them to protrude outwardly from those openings as shown in FIG. 3, and a top opening 74 for a manually rotatable film winding knob 76. Three spaced resilient flexible retainers 78, 78, 78 project from the front outer cover part 18, around the front opening 70, to engage and hold the front convex portion 50 in that opening with the positioning projections 64, 64, 64, 64 in the openings 72, 72, 72, 72 and with the flat arcuate peripheral (edge) projection 60 of the front convex portion lying against the front outer cover part 18 along the front opening 70. See FIGS. 1–3. A manually depressible shutter release button 80 fits into a center opening 82 in the film winding knob 76. The rear outer cover part 20 has a rear opening 84 that is large enough for the rear convex portion 42 of the elastomeric insert 24 to be received in that opening and protrude outwardly as shown in FIG. 4. Several retainers similar to the retainers 78 project from the rear outer cover part 20, around the rear opening 84, to engage and hold the rear convex portion 42 in that opening. The flat arcuate peripheral (edge) projections 58, 58 of the rear convex portion 40 lie against the rear outer cover part 20 along the rear opening 84.

During assembly of the camera 10, the elastomeric insert 24 is placed over the front and rear inner cover parts 12 and 14 in a way that the front opening 48 is positioned over the taking lens 34, the front and rear viewfinder openings 44 and 40 are positioned over the front and rear viewfinder lenses 26 and 28, and the top opening 56 is positioned over the frame counter window 38. See FIGS. 1–4. The front and rear outer cover parts 18 and 20 are placed over the elastomeric insert 24 in a way that the collar 54 protrudes outwardly from the in-common opening 66, the front convex portion 50 protrudes outwardly from the front opening 70, and the rear convex portion 42 protrudes outwardly from the rear opening 84. The, the film winding knob 76 is inserted part way in the top opening 74, and the shutter release button 80 is inserted in the center opening 82.

The invention has been described with reference to a preferred embodiment. However, it will be appreciated that variations and modifications can be effected by a person of ordinary skill in the art without departing from the scope of the invention.

PARTS LIST 10. camera
12. front inner cover part
14. rear inner cover part
16. inner housing
18. front outer cover part
20. rear outer cover part
22. outer housing
24. elastomeric insert
26. front viewfinder lens
28. rear viewfinder lens
30. front viewfinder opening
32. rear viewfinder opening
34. taking lens
36. another front opening
38. top frame counter window
40. rear viewfinder opening
42. rear convex portion
44. front viewfinder opening
46. front flat portion
48. another front opening
50. front convex portion
52. flexible interconnection
54. integral collar
56. top opening
58. flat arcuate peripheral (edge) projections
60. flat arcuate peripheral (edge) projection
62. flat finger-like projections
64. positioning projections
66. in-common top opening
68. front viewfinder opening
70. another front opening
72. front openings
74. top opening
76. film winding knob
78. retainers
80. shutter release button
82. center opening
84. rear opening

What is claimed is:

1. A camera comprising an inner housing, a protective outer housing that covers said inner housing, a taking lens within said inner housing, and an elastomeric member having a light admitting opening for said taking lens, is characterized in that:

said elastomeric member is positioned snugly between said outer and inner housings to provide shock dampening at least in the vicinity of said taking lens.

2. A camera as recited in claim 1, wherein said elastomeric member has a convex portion that includes said opening in the elastomeric member for said taking lens, and said outer housing has an opening for said taking lens that is large enough to permit said convex portion of said elastomeric member to protrude from said opening in the outer housing.

3. A camera as recited in claim 2, wherein said outer housing has retainers adjacent said opening in the outer housing which retain said elastomeric member in said opening in the outer housing.

4. A camera as recited in claim 2, wherein said outer housing has a series of openings that at least partially surround said opening in the outer housing for said taking lens, and said elastomeric member has respective projections that at least partially surround said opening in the elastomeric member and are positioned in said series of openings in said outer housing.

5. A camera comprising a pair of aligned front and rear viewfinder lenses, a pair of front and rear inner cover parts that together form an inner housing which contains said front and rear viewfinder lenses at respective front and rear viewfinder openings in said front and rear inner cover parts, a protective outer housing that covers said inner housing, and an elastomeric member, is characterized in that:

said outer housing has respective front and rear viewfinder openings for said front and rear viewfinder lenses; and said elastomeric member is a single-piece member that has respective front and rear viewfinder openings positioned snugly between said front and rear viewfinder openings in said outer and inner housings to provide shock dampening at least in the vicinity of said viewfinder lenses.

6. A camera as recited in claim 5, wherein said elastomeric member has a flexible interconnection interconnecting said front and rear viewfinder openings in said elastomeric member.

7. A camera as recited in claim 5, wherein said elastomeric member has a convex portion that includes said rear viewfinder opening in the elastomeric member, and said rear viewfinder opening in said outer housing is large enough to permit said convex portion of said elastomeric member to protrude from said rear viewfinder opening in the outer housing.

8. A camera as recited in claim 5, wherein at least one of said front and rear inner cover parts has a frame counter window, said outer housing has an opening for said frame counter window, and said elastomeric member has an opening for said frame counter window positioned snugly between the frame counter window and said opening in said outer housing for the frame counter window.

9. A camera as recited in claim 8, wherein said elastomeric member has a collar portion that surrounds said opening in the elastomeric member for said frame counter window and protrudes from said opening in said outer housing for the frame counter window.

10. A method of assembling a camera comprising the steps of:

placing a one-piece shock-dampening elastomeric member over the front, top and rear of an inner housing, with respective openings in the elastomeric member being aligned with openings in the inner housing for a taking lens and a pair of front and rear viewfinder lenses; and placing a protective outer housing over the inner housing and the elastomeric member, with respective openings in the outer housing being aligned with the openings in the elastomeric member.

\* \* \* \* \*